United States Patent Office 3,165,557
Patented Jan. 12, 1965

3,165,557
PROCESS FOR PREPARING α-MONOOLEFINIC
HYDROCARBONS
Harry W. Coover, Jr., and Richard L. McConnell, Kingsport, Tenn., assignors to Eastman Kodak Company, Rochester, N.Y., a corporation of New Jersey
No Drawing. Filed June 30, 1960, Ser. No. 39,821
8 Claims. (Cl. 260—683.15)

This invention relates to a new and improved telomerization process. In a specific aspect this invention relates to a novel process for telomerizing low molecular weight α-monoolefinic hydrocarbons to form higher molecular weight monoolefinic hydrocarbons. In another aspect this invention relates to a novel process for the telomerization of ethylene to form higher molecular weight straight chain α-monoolefinic hydrocarbons that are substantially liquid products.

Straight chain monoolefinic hydrocarbons, and particularly those having the double bond on a terminal carbon atom are extremely useful in many chemical processes. For example, in an Oxo process where an olefinic hydrocarbon is reacted with carbon monoxide and hydrogen, it is frequently desirable to employ a 1-olefin as a starting material in order to obtain a hydroformylation product having the —CHO group in the desired position in the carbon chain. Similarly, there are other known reactions where the location of the unsaturated bond in the carbon chain is of considerable significance for the formation of the desired product.

There are various procedures known in the art for the polymerization of ethylene and similar hydrocarbons to form higher molecular weight products. However, in these processes it has been recognized that the location of the unsaturated bond in the carbon chain is usually in a position other than on a terminal carbon atom, and it is also recognized that the product that results contains substantial chain branching instead of having a straight carbon chain.

This invention is concerned with, and has for an object, the provision of a novel process for telomerizing low molecular weight α-monoolefins to form higher molecular weight monoolefins. Another object of this invention is to provide a process for the telomerization of ethylene to form higher molecular weight substantially straight chain α-monoolefinic hydrocarbons. A further object of this invention is to provide a novel catalyst for the telomerization of ethylene to higher molecular weight substantially straight chain α-monoolefins and to obtain results that could not have been predicted from the prior art. Other objects of this invention will be apparent from the detailed description and claims that follow.

These and other objects are attained by means of the process embodying the present invention wherein α-monoolefins, either singly or in admixture, are readily telomerized to higher molecular weight products by effecting the telomerization in the presence of the polymeric reaction product of a methylene-halide with a metal from the group consisting of aluminum, zinc and magnesium as a catalyst for the process. This polymeric reaction product alone is an effective catalyst for the process. However, in those reactions where a higher yield of 1-olefins is desired the polymeric catalyst can be in a complex with a co-catalyst which by itself is not an effective catalyst for the reaction. Throughout the specification and claims the terms polymeric catalyst or polymeric reaction product are intended to include the catalyst alone or in a complex with a co-catalyst that tends to increase the percentage of 1-olefins in the product and that does not increase the yield of solid product. The inventive process is carried out in liquid phase in an inert organic liquid and preferably an inert liquid hydrocarbon vehicle, but the process can be carried out in the absence of a diluent. The process proceeds with excellent results over a temperature range of from 80° C. to 300° C. although it is preferred to operate within the range of from about 100° C. to about 225° C. Likewise, the reaction pressures may be varied widely from about atmospheric pressure to very high pressures of the order of 20,000 p.s.i. or higher. In many instances pressures not in excess of 7500 p.s.i. are used. The liquid vehicle employed is desirably one which serves as an inert liquid reaction medium.

The invention is of particular importance in the preparation of monoolefinic hydrocarbons and particularly α-monoolefinic hydrocarbons that are substantially liquid products. In the reaction, olefinic hydrocarbons, such as ethylene, propylene, the butenes as well as other α-monoolefins containing up to 10 carbon atoms are used. When ethylene is used, the product of the process contains a high percentage of straight chain α-monoolefins, but it will be understood that other monoolefinic hydrocarbons can be produced. It was surprising to find some straight chain hexene among the products derived from propylene. Appreciable quantities of branched-chain olefins are produced when propylene and higher α-olefins are used in the process.

The improved results obtained in accordance with the invention depend upon the particular catalyst employed. Thus, the catalyst is the non-distillable polymeric solid reaction product of a methylene halide with a metal from the group consisting of aluminum, zinc and magnesium as described in the copending and now abandoned application of Shearer et al., Serial No. 549,868, filed November 29, 1955, used alone or in a complex with one or more co-catalysts that increase the percentage of α-monoolefins in the product. The polymeric reaction product is the product obtained by reacting a methylene halide, such as methylene bromide or chloride, with aluminum, magnesium or zinc, and is a complex material of polymeric nature whose structure is not readily definable. The polymeric reaction product of methylene bromide and aluminum is preferred, although the other halides and metals can be used. Among the co-catalysts are the hexaalkyl phosphoric triamides wherein the alkyl radicals contain from 1 to 8 carbon atoms, such as methyl, ethyl, propyl, hexyl and octyl. Acetylenic compounds can also be used as co-catalysts. The acetylenic compounds have the formula RC≡CH wherein R is a hydrocarbon radical containing 1 to 12 carbon atoms such as alkyl, aryl and aralkyl. Metals such as nickel, cobalt and platinum can also be used as co-catalysts. The metals can be used as colloidally suspended metal or they may be used in the form of a metal salt, such as the chloride, acetate, sulfate, phosphate, nitrate and the like. Metal complexes, such as cobalt acetylacetonate, platinum acetylacetonate or nickel acetylacetonate, can also be employed. If desired, the catalyst for our process can be dispersed on an inert support such as silica gel, alumina, celite, kieselguhr, aluminosilicates, activated carbon, and the like, but it will be understood that the process can be effected without using a catalyst support.

The limiting factor in the temperature of the process appears to be the decomposition temperature of the catalyst. Ordinarily, temperatures from 100° C. to 225° C. are employed, although temperatures as low as 80° C. or as high as 300° C. can be employed if desired. Usually, it is not desirable or economical to effect the polymerization at temperatures below 80° C., and the process can be readily controlled at these temperatures.

The reaction embodying the invention can be carried out batchwise or in a continuous flowing stream process. The continuous processes are preferred for economic reasons, and particularly good results are obtained using continuous processes wherein a reaction mixture of constant composition is continuously and progressively introduced into the reaction zone and the mixture resulting from the reaction is continuously and progressively withdrawn from the reaction zone at an equivalent rate, whereby the relative concentration of the various components in the reaction zone remains substantially unchanged during the process.

In the continuous flowing stream process, the temperature is desirably maintained at a substantially constant value within the preferred range in order to achieve the highest degree of uniformity of product. Since it is desirable to employ a solution of the monomer of relatively high concentration, the process is desirably effected under a pressure of up to 7500 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 5% by weight based on the weight of the vehicle. The concentration of the monomer in the vehicle will vary rather widely depending upon the reaction conditions and will usually range from about 2 to 50% by weight. The process can also be conducted without using a solvent or diluent and with the monomer in liquid form.

In our process the amount of co-catalyst that is used is generally in a molar ratio of co-catalyst to polymeric catalyst not in excess of 1:1. When hexaalkyl phosphoric triamide is used the molar ratio is within the range of 0.1 to 1 and when a metal or metal complex is used the molar ratio usually does not exceed 0.01. The polymerization time can be varied as desired and will usually be of the order of from 30 minutes to several hours in batch processes. Contact times of from 1 to 8 hours are commonly employed in autoclave type reactions. When a continuous process is employed, the contact time in the reaction zone can also be regulated as desired, and in some cases it is not necessary to employ reaction or contact times much beyond one-half to one hour since a cyclic system can be employed.

The organic vehicle employed can be an aliphatic alkane or cycloalkane such as pentane, hexane, heptane or cyclohexane, or a hydrogenated aromatic compound such as decahydronaphthalene, or a high molecular weight liquid paraffin or mixture of paraffins which are liquid at the reaction temperature. Aromatic hydrocarbons such as benzene, toluene, xylene, or the like, are not advantageous since they tend to undergo some alkylation during the reaction. The nature of the vehicle is subject to considerable variation, although the vehicle employed should be liquid under the conditions of reaction and relatively inert. The hydrocarbon liquids are desirably employed. Other solvents which can be used include n-octane, isooctane, methyl cyclohexane, and any of the other well-known inert liquid hydrocarbons.

The telomerization ordinarily is accomplished by merely admixing the components of the telomerization mixture, and no additional heat is necessary unless it is desired to effect the reaction at an elevated temperature. When the highly uniform products are desired employing the continuous process wherein the relative proportions of the various components are maintained substantially constant, the temperature is desirably controlled within a relatively narrow range. This is readily accomplished since the solvent vehicle forms a high percentage of the reaction mixture and hence can be heated or cooled to maintain the temperature as desired.

The following examples are illustrative of this invention.

Example 1

A catalyst system consisting of triethyl aluminum (0.044 mole), phenylacetylene (0.005 mole), and nickel acetylacetonate (.0004 mole), was placed in a dry 300 ml. steel autoclave containing 100 ml. of dry benzene while operating in a nitrogen filled dry box. The autoclave was purged with ethylene and then pressured to 500 p.s.i. with ethylene. Then the reaction mixture was heated to 200° C. and the ethylene pressure was maintained at 3500 p.s.i. for 3 hours with rocking. The reaction mixture was cooled to 25° C. and vented through a Dry Ice-acetone trap. About 4 ml. of butene was condensed in this trap. The autoclave was almost full of dark liquid. The infrared spectrum of this crude product indicated the presence of vinylidene (branched-chain), internal straight-chain, and terminal olefinic unsaturation in that order. The crude sample was further investigated by gas chromatography and this indicated the presence of olefins containing 4 to about 12 carbon atoms. When the $C_6$ olefins were investigated, the major component was 2-ethyl-1-butene, while the minor components present were cis and trans 2-hexene, 1-hexene, and cis 3-methyl-2-pentene. The $C_8$ fraction was predominantly 2-ethyl-1-hexene with only a very small amount of internally unsaturated straight-chain material and 1-octene was not present at all. This illustrates that very little straight-chain material is present in the reaction mixture and only a very small amount of terminally unsaturated straight chain material is present. Excluding the benzene solvent, the assay of this sample is listed in the following table:

| Olefin | Relative Amount Present | Number of Compounds Present |
|---|---|---|
| $C_4$ | 1 | 2 |
| $C_6$ | 1.3 | 5 |
| $C_8$ | 1.6 | 3 |
| $C_{10}$ | 1.7 | 5 |
| $C_{12}$ | 0.8 | 5 |

The number of compounds present was determined by gas chromatography and the number of compounds indicated is the minimum number of compounds present since the peak of some compounds may overlap that of others.

Example 2

Ethylene was reacted at 200° C. and 3500 p.s.i. ethylene pressure for a period of 3 hours in a 300 ml. autoclave in the presence of a catalyst system consisting of polymeric product of methylene bromide and aluminum (.04 mole), phenylacetylene (0.005 mole), nickel acetylacetonate (0.0004 mole) using 100 ml. of dry cyclohexane as the solvent. After cooling the autoclave to room temperature, it was vented through a Dry Ice-acetone trap but nothing was condensed. The autoclave was nearly full of a dark liquid. The crude product and solvent amounted to 193 g. and the infrared spectrum of this crude product indicated the presence of 1-olefins with a small amount of internal straight-chain olefins. No vinylidene unsaturation was detected. Gas chromatographic analysis of this mixture indicated the product to be olefins containing 4 to 34 carbon atoms. The following assay of the $C_4$–$C_{12}$ cuts indicates the relative amount of each olefin present.

Olefin:                       Relative amount present
- $C_4$ ---- 0.1
- $C_6$ ---- 1.0
- $C_8$ ---- 6.0
- $C_{10}$ ---- 6.0
- $C_{12}$ ---- 3.5

This reaction was repeated except that the phenylacetylene was left out of the catalyst system. Again no solid polymer was obtained but about 5 ml. of butene was collected when the autoclave was vented at the end of the run. The autoclave contained 203.5 g. of liquid olefins and solvent. Again the infrared spectrum indicated only $RCH=CH_2$ and $RCH=CHR'$ products, although, the products contained slightly more internal unsaturation than the previous run. Olefins were still predominant.

Similar results were obtained when mineral spirits, butane, hexane, heptane, kerosene, or methylcyclohexane were used as the solvent instead of cyclohexane.

Similar results were also obtained when cobalt or platinum was used instead of the nickel.

Example 3

When ethylene was reacted in the presence of polymeric product of methylene bromide and aluminum (0.04 mole), at 200° C. and 3500 p.s.i. for 3 hours using 100 ml. of cyclohexane as the solvent, a total of 165.5 g. of liquid olefin and solvent were obtained. Infrared analysis of this mixture indicated the products to be predominantly $RCH=CH_2$ olefins containing only traces of vinylidene unsuatration. This example illustrates that the use of nickel and/or the acetylene compound is unnecessary.

Example 4

Ethylene was polymerized using the catalyst system of Example 2 at 150° C. The products were similar to those obtained in Example 2.

Example 5

The reaction described in Example 2 was repeated except that the reaction was conducted at 7000 p.s.i. rather than at 3500 p.s.i. ethylene pressure. In this case, some low-molecular weight polyethylene was obtained in addition to the olefinic products described in Example 2.

Example 6

The reaction described in Example 2 was repeated except the ethylene pressure was maintained at 100 p.s.i. instead of 3500 p.s.i. In this case, the products were similar to those of Example 2.

Example 7

Propylene (150 ml.) was reacted at 200° C. for a period of 3 hours in a 300 ml. rocking autoclave in the presence of a catalyst system consisting of polymeric product of methylene bromide and aluminum (0.04 mole) and nickel acetylacetonate (0.0004 mole) using 50 ml. of dry cyclohexane as the solvent. After cooling the autoclave to room temperature, it was vented through a Dry Ice-acetone trap but no propylene was recovered. The crude product and solvent amounted to 115.2 g. An infrared spectrum of the crude product indicated the presence of $RCH=CHR'$ unsaturation along with traces of $RCH=CH_2$ and $RR'C=CH_2$ unsaturation. Distillation of the reaction mixture yielded $C_6$, $C_9$, $C_{12}$ and $C_{15}$ olefins. The $C_{15}$ cut distilled at 125 to 137° C. at 3 to 6 mm. pressure, $n_D^{20}$ 1.4670. Assay of the $C_6$ cut by gas chromatography indicated the major $C_6$ components to be cis and trans 2-hexene and cis and trans 4-methyl-2-pentene. Minor $C_6$ components were 4-methyl-1-pentene, 2-methyl-1-pentene, and 2,3-dimethyl-2-butene.

The results were similar when the reaction was repeated at 300° C. The results were also similar when Raney nickel was used instead of the nickel acetylacetonate.

Eaxmple 8

Propylene was reacted according to the procedure of Example 7 except that the catalyst system also contained phenylacetylene (0.005 mole). The results were similar to those obtained in Example 7 except that a small amount of propylene was recovered.

The reaction was repeated except that the nickel acetylacetonate and the phenylacetylene were omitted from the catalyst system. Again a small amount of propylene was recovered, but the products were similar to those obtained in Example 7.

Example 9

1-butene was reacted according to the procedure described in Example 7. Distillation of the reaction mixture yielded $C_8$, $C_{12}$, $C_{16}$ and $C_{20}$ olefins.

Dimers, trimers, tretramers, and pentamers were also obtained when 1-decene was treated in a similar manner.

Although the invention as been described in considerable detail with reference to certain preferred embodiments thereof, variations and modifications can be effected within the spirit and scope of the invention as described hereinabove and as defined in the appended claims.

We claim:

1. The method for producing monoolefinic hydrocarbons which comprises telomerizing an α-monoolefinic hydrocarbon containing up to 10 carbon atoms in the presence of the non-distillable polymeric solid reaction product of a methylene halide with a metal selected from the group consisting of aluminum, zinc and magnesium as the sole effective telomerization catalyst.

2. The method for producing straight-chain α-monoolefinic hydrocarbons which comprises telomerizing ethylene in the presence of the non-distillable polymeric solid reaction product of a methylene halide with a metal from the group consisting of aluminum, zinc and magnesium as the sole effective telomerization catalyst.

3. The method for producing straight-chain α-monoolefinic liquid hydrocarbons which comprises telomerizing ethylene with the non-distillable polymeric solid reaction product of methylene bromide and aluminum as the sole effective telomerization catalyst.

4. The method for producing straight-chain α-monoolefinic liquid hydrocarbons which comprises telomerizing ethylene in the presence of a catalyst consisting essentially of the non-distillable polymeric solid reaction product of methylene bromide and aluminum with nickel acetylacetonate as a co-catalyst.

5. The method for producing straight-chain α-monoolefinic liquid hydrocarbons which comprises telomerizing ethylene with a catalyst consisting essentially of the non-distillable polymeric solid reaction product of methylene bromide and aluminum, phenyl acetylene and nickel acetylacetonate.

6. As a composition of matter, a catalyst for the telomerization of ethylene to form straight-chain liquid α-monoolefins consisting essentially of the non-distillable polymeric solid reaction product of a methylene halide with a metal from the group consisting of aluminium, zinc and magnesium with nickel acetylacetonate.

7. As a composition of matter, a catalyst for the telomerization of ethylene to form straight-chain liquid monoolefins consisting essentially of the non-distillable polymeric solid reaction product of methylene bromide and aluminum with nickel acetylacetonate.

8. As a composition of matter, a catalyst for the telomerization of ethylene to form straight-chain liquid monoolefins consisting essentially of the non-distillable polymeric solid reaction product of methylene bromide and aluminum, phenyl acetylene and nickel acetylacetonate.

References Cited in the file of this patent

UNITED STATES PATENTS

| | | |
|---|---|---|
| 2,781,410 | Ziegler et al. | Feb. 12, 1957 |
| 2,969,408 | Nowlin et al. | Jan. 24, 1961 |
| 3,018,278 | Shearer et al. | Jan. 23, 1962 |
| 3,026,310 | Shearer et al. | Mar. 20, 1962 |
| 3,109,838 | Chatt et al. | Nov. 5, 1963 |

OTHER REFERENCES

Rochow et al.: "The Chemistry of Organometallic Compounds," John Wiley and Sons, Inc., New York, 1957, pages 85 and 103.